3,022,299
CONDITIONING OF PIGMENTS
Harold N. Schmidt, Plainfield, Volney Tullsen, Westfield, Leon Katz, Springfield, and Lawrence D. Lytle, Plainfield, N.J., assignors to General Aniline & Film Corporation, New York, N.Y., a corporation of Delaware
No Drawing. Filed Dec. 30, 1958, Ser. No. 783,718
8 Claims. (Cl. 260—246)

The present invention relates to a process for conditioning water insoluble dioxazine and vattable organic pigments, and more particularly to an acid milling procedure which provides such pigments of pleasing and improved shades and whose particle size, particle size distribution, and particle surface characteristics render them exceedingly suitable for pigmentation of coating and printing compositions, self-supporting films and other solid bodies and the like.

In U. S. Patent No. 2,766,244 there is disclosed and claimed a process for conditioning water insoluble vattable quinoidic pigments comprising milling with forces predominantly shearing in nature a mixture comprising such a pigment and a quantity of sulfuric, chloroacetic, phosphoric, chlorosulfonic or lower alkyl sulfonic acid sufficient to produce with the pigment a doughy, kneadable mass, and then diluting the resulting milled mixture with water. That process enables the attainment of highly desirable results. It eliminates many of the disadvantages attributable to the prior conventional methods of acid pasting involving dilution with water of a sulfuric acid solution of the pigment, which require large amounts of acid entailing increased initial costs, cost of equipment, corrosion and disposal problems, and the like. Said process also greatly shortens the treatment time, produces a presscake with a relatively high solids content, and is applicable to pigments which are unstable to conventional acid pasting.

While the process of said patent is satisfactory in most instances, the products produced thereby sometimes do not have the shades found highly desirable for certain purposes. Further, the acids employed in such process and in the conventional sulfuric acid pasting processes and the like raise problems of corrosion and the like. Still further, a number of the above-mentioned compounds are adversely affected by the action of the previously mentioned acids, including undesired sulfonation, phosphorylation and the like.

It is an object of this invention to provide a process which will have substantially all of the advantages of the process described in said patent and which will produce dioxazine and vattable organic pigments having improved shades, soft-grinding powders from the presscakes and the like. Other objects and advantages will appear as the description proceeds.

The above objects are attained by the instant invention which is directed to a process comprising milling with forces predominantly shearing in nature a mixture, in the form of a doughy, kneadable mass, comprising a member of the group consisting of water insoluble dioxazine and vattable organic pigments and about 0.5 to 10 parts by weight per part of said pigment of an aromatic sulfonic acid, and then diluting the milled mixture with water. The thus conditioned pigment is then recovered from the aqueous mixture in known manner, as by filtration, centrifugation, decantation, or the like and washed acid free.

The procedure of this invention is suitable for the conditioning of any water insoluble vattable organic compound. Illustratively, the process is applicable to the treatment of anthraquinones, and dyestuffs of the indigoid and quinonoid type including, for example, acylamino anthraquinones, anthanthrones, anthraquinone acridines and acridones, anthraquinone azines, anthraquinone oxazoles, anthraquinone thiazoles, benzanthrones, carbazoles of the anthraquinone series, dipyrazolanthrones, heterocyclic imides and imidazoles, indigos, flavanthrones, pyranthrones, pyrene quinones, thionaphthenes, thioxanthrones, and the like. Obviously the compounds may contain inert substituents which do not prevent the attainment of the desired results herein.

As the water insoluble dioxazine pigments which may be treated in accordance with the present process, there may be mentioned as especially suitable the product commonly referred to as Permanent Violet RL, prepared in known manner by condensing 2 moles of 3-amino-9-ethylcarbazole with 1 mole of chloranil and then ring closing the condensation product.

The aromatic sulfonic acids employed in the instant invention are well known, those preferred being of the monocyclic aryl sulfonic acid type as exemplified by benzene sulfonic acid, o-, m- and p-toluene sulfonic acid, phenol sulfonic acid, xylene sulfonic acid and mixtures thereof, and the like. Among these, the toluene sulfonic acids, particularly the paraisomer or a mixture of the o-, m- and p-isomers containing the para isomer in major proportions, are preferred as yielding optimum results. Other aromatic sulfonic acids may, however, be employed, including generally the benzene and naphthalene sulfonic acids and their nuclearly substituted mono- and di-hydroxy and -lower alkyl (methyl and ethyl) derivatives. These acids are employed in the instant process in substantially 100% concentration although lower concentrations down to about 75% may be employed since the presence of this small amount of water in the mixture being milled is not detrimental to the attainment of the desired results.

In carrying out the process, the quantity of acid employed should be that necessary to produce with the pigment a doughy, kneadable mass. The particular quantity of acid which will give this result can be readily determined by routine experimentation. If the quantity is too small, the pigment does not wet out properly, while too great a quantity of acid does not allow adequate shearing and leads to lumpy masses in which the acid does not contact all pigment particles. As stated, the quantity of acid employed will generally fall within the range of about 0.5 to 10 parts, preferably 0.5 to 5 parts, by weight per part of pigment.

The particular apparatus used for effecting the milling of the pigment-mass must be one capable of exerting a substantially uniform shearing action throughout the mass. It is preferred to use a Werner-Pfleiderer type of kneading mill, but Banbury mixers or other kneading apparatus or dough mixers may be employed which operate by other mechanisms provided that they operate to exert a uniform shearing force on the mixture being milled.

The temperature at which the process is carried out is not critical and may in fact vary between 0 and 150° C. The duration of milling may range from about ½ to 10 hours, depending upon the particular acid, acid concentration, and temperature employed in the milling operation. A longer milling period may in some cases be necessary but the reaction can in any particular instance be followed by periodic examination of a sample of the mass microscopically to ascertain when a suitable fine particle size distribution has been obtained. Following completion of the milling operation, the milled mixture is diluted with water as by drowning. The water may be added to the milled mixture or vice versa. The pigment is then isolated from the aqueous mixture in known manner, usually by filtration.

If desired, the milling in accordance with this process may be carried out in the presence of up to 5 parts of a water-soluble inorganic salt such as sodium or potassium sulfate, chloride, phosphate, acid sulfate or acid phosphate and/or up to 0.2 part of a benzenoid organic liquid such as nitrobenzene, xylene or o-di-chlorobenzene, per part of pigment. Similarly, said aromatic sulfonic acid may contain up to 25% by weight thereof of sulfuric acid or the like, although it will be understood that such addition will pro tanto tend to reduce the anticorrosive and certain other desirable effects of the present process.

The use of the present aromatic sulfonic acids in the milling process also reduces or eliminates obnoxious odores in the final pigment which might arise through the use of non-sulfonated aromatic solvents. Other advantages of the instant process have been pointed out above, such advantages including or enabling an effective solution to the problem of sulfonation, etc., of the pigments being treated, ease of handling, increased size of batches, increased presscake solids content, increased safety, reduced disposal problems, softer powders and improved particle size, particle size distribution and particle surface characteristics. Pigment particles may be produced averaging less than about 1 micron, and optimally less than 0.1–0.2 micron in size.

The following examples, in which parts are by weight unless otherwise indicated, are only illustrative of the instant invention and are not to be regarded as limitative.

*Example 1*

1 part of the condensation product of 2 moles of p-anisidine and 1 mole of 3,4,9,10-perylene tetracarboxylic acid were added to a kneading machine along with 1 part of anhydrous sodium sulfate and four parts of a commercial toluene sulfonic acid, containing approximately 80% of the para, 15% of the ortho, and 5% of the meta isomers. The resultant mixture was kneaded for 2 hours at a temperature of 20–30° C. At the end of this time 10 parts of water was added to thin the mass to a pourable consistency. The magma was then discharged into 30 parts of water, stirred to uniformity, filtered to isolate the pigment, and the pigment washed acid-free.

The bright red pigment thus obtained was suitable for incorporation into textile printing inks or upon drying was satisfactory for use in printing inks, plastics and rubber.

*Example 2*

1 part of the condensation product of 2 moles of p-toluidine and 1 mole of 3,4,9,10-perylene tetracarboxylic acid was treated as was the condensation product described in Example 1.

The bright red pigment thus obtained was suitable for incorporation in any common pigmented system.

*Example 3*

1 part of the condensation product of 2 moles of benzylamine and 1 mole of 3,4,9,10-perylene tetracarboxylic acid was treated as was the condensation product described in Example 1.

The bright maroon pigment thus obtained was suitable for incorporation into any common pigmented system.

*Example 4*

The procedure of Example 1 was modified by substituting benzene sulfonic acid for the mixed toluene sulfonic acids.

The resultant pigment was much stronger and brighter than the starting material, and it was suitable for all common pigment applications.

*Example 5*

The procedure of Example 1 was repeated except that mixed xylene sulfonic acids were substituted for the mixed toluene sulfonic acids.

The resulting pigment was much stronger and brighter than the starting material, and it was suitable for all common pigment applications.

*Example 6*

The procedure of Example 1 was repeated except that mixed naphthalene sulfonic acids were substituted for the toluene sulfonic acids.

The resultant pigment was much stronger and brighter than the starting material and was suitable for all common pigment applications.

*Example 7*

The procedure of Example 1 was duplicated in all respects except temperature. In this case, the temperature of the magma was kept low with cooling. Actually, 5 to 10° C. was maintained throughout the mixing time. Upon isolation, a pigment was obtained that was much stronger than the starting crude material and was suitable for all common pigment applications.

*Example 8*

The procedure of Example 1 was duplicated in all respects except temperature. In this case, the temperature of the magma was kept high with steam in the mixer jacket. Actually 110 to 130° C. was maintained during the mixing time. Upon isolation a pigment was obtained that was much stronger than the starting crude material and was suitable for all common pigment applications.

*Example 9*

1 part of the anthraquinoneoxazole commonly referred to as Indanthrene Red FBB and three parts of commercial toluene sulfonic acid were added to a Werner-Pfleiderer kneading mixer and kneaded at room temperature for 3 hours. The magma was then thinned with water and isolated as was the product described in Example 1.

The resultant pigment was considerably stronger, yellower and brighter than the starting material, and was suitable for all common pigment applications.

*Example 10*

1 part of the condensation product of 1 mole of 1,4,5,8-naphthalene tetracarboxylic acid and 2 moles of o-phenylene diamine commonly known as Indanthrene Brilliant Orange GR was treated as was the Red FBB of Example 9.

The resultant pigment was considerably more transparent, brighter and stronger than the starting material and was suitable for all common pigment applications.

*Example 11*

1 part of 5,5'-dichloro-7,7'-dimethyl-thioindigo commonly known as Indanthrene Red Violet RH was treated as the condensation product described in Example 1.

The bright maroon pigment thus obtained was suitable for incorporation into any common pigmented system.

*Example 12*

1 part of crude tetrachlorodibenzanthrone was treated as was the condensation product described in Example 1.

The strong blue pigment thus obtained was much stronger and brighter than the starting material and was entirely suitable for incorporation into any common pigmented system.

*Example 13*

8 parts of commercial mixed toluene sulfonic acids, 1 part anhydrous sodium sulfate and 2 parts of Permanent Violet RL crude were added to a kneading machine and the mass mixed at 0° to 50° C. for 1 hour. The reaction was exothermic and the mass became very viscous. The mass was kneaded for an additional 3 hours, thinned with 10 parts water and dumped into 80 parts additional water. The resultant slurry was made slightly alkaline with soda ash, boiled for 15 minutes, filtered and washed. The resultant pigment was stronger, redder and brighter than that made by the dilute sulfuric acid milling technique.

Example 14

Example 13 was repeated using a temperature in the milling mass of 75 to 130° C. Results of this experiment were fully as good as those obtained at the lower temperatures referred to in Example 13.

This invention has been disclosed with respect to certain preferred embodiments, and there will become obvious to the person skilled in the art various modifications, equivalents or variations thereof which are intended to be included within the spirit and scope of this invention.

We claim:

1. A process comprising milling with forces predominantly shearing in nature a mixture in the form of a doughy, kneadable mass comprising a member of the group consisting of water insoluble dioxazine and water insoluble vattable indigoid and quinonoid organic pigments, and about 0.5 to 10 parts by weight per part of said pigment of an aryl sulfonic acid having a concentration of about 75 to 100% and selected from the group consisting of benzene and naphthalene sulfonic acids and their nuclearly mono- and di-substituted hydroxy and lower alkyl derivatives, and then diluting the milled mixture with water.

2. A process as defined in claim 1 wherein said acid is monocyclic.

3. A process as defined in claim 1 wherein said acid is an isomeric mixture of toluene sulfonic acids containing the para isomer in major proportions.

4. A process as defined in claim 1 wherein said acid is p-toluene sulfonic acid.

5. A process as defined in claim 1 in which the pigment is a vattable organic pigment.

6. A process as defined in claim 1 in which the pigment is Permanent Violet RL.

7. A process as defined in claim 1 wherein about 0.5 to 5 parts of said acid are employed per part of pigment.

8. A process as defined in claim 1 wherein said mixture also contains up to 5 parts of a water soluble inorganic salt, selected from the group consisting of the sulfates, chlorides, phosphates, acid sulfates and acid phosphates of sodium and potassium, per part of pigment.

References Cited in the file of this patent

UNITED STATES PATENTS

| | | |
|---|---|---|
| 2,176,011 | Murch et al. | Oct. 10, 1939 |
| 2,334,812 | Detrick et al. | Nov. 23, 1943 |
| 2,524,672 | Lecher et al. | Oct. 3, 1950 |
| 2,540,775 | Brouillard et al. | Feb. 6, 1951 |
| 2,716,649 | Brouillard et al. | Aug. 30, 1955 |
| 2,770,629 | Eastes | Nov. 13, 1956 |

FOREIGN PATENTS

| | | |
|---|---|---|
| 710,229 | Great Britain | June 9, 1954 |